United States Patent [19]
Engle

[11] 3,742,784
[45] July 3, 1973

[54] DIFFERENTIAL MECHANISM

[75] Inventor: Jack F. Engle, Muncie, Ind.

[73] Assignee: Borg-Warner Corporation, Chicago, Ill.

[22] Filed: Aug. 11, 1971

[21] Appl. No.: 170,863

[52] U.S. Cl. .......................... 74/710.5, 184/6.12
[51] Int. Cl. ...................... F16h 1/44, F01m 11/02
[58] Field of Search .................... 74/710.5, 711; 184/6.12

[56] References Cited
UNITED STATES PATENTS

| | | | |
|---|---|---|---|
| 3,580,108 | 5/1971 | Mieras | 74/711 |
| 3,533,488 | 10/1970 | Engle et al. | 74/710.5 X |
| 3,051,020 | 8/1962 | Hartupec | 74/710.5 |
| 3,327,564 | 6/1967 | Thorpe | 74/711 |
| 3,400,611 | 9/1968 | Engle | 74/710.5 |
| 3,402,799 | 9/1968 | Thorpe | 74/711 X |
| 3,429,400 | 2/1969 | Engle et al. | 74/710.5 X |
| 3,495,298 | 2/1970 | Engle et al. | 74/711 X |

*Primary Examiner*—Arthur T. McKeon
*Attorney*—Donald W. Banner, Robert L. Zieg et al.

[57] ABSTRACT

A cone shaped friction element adapted to be made from powdered metal technology and used in a limited slip differential is disclosed. The friction element has a spiralling lubrication groove along a conical surface thereof. The lubrication groove is formed so that the friction element may be easily removed from a die in which it is formed from powdered metal.

6 Claims, 5 Drawing Figures

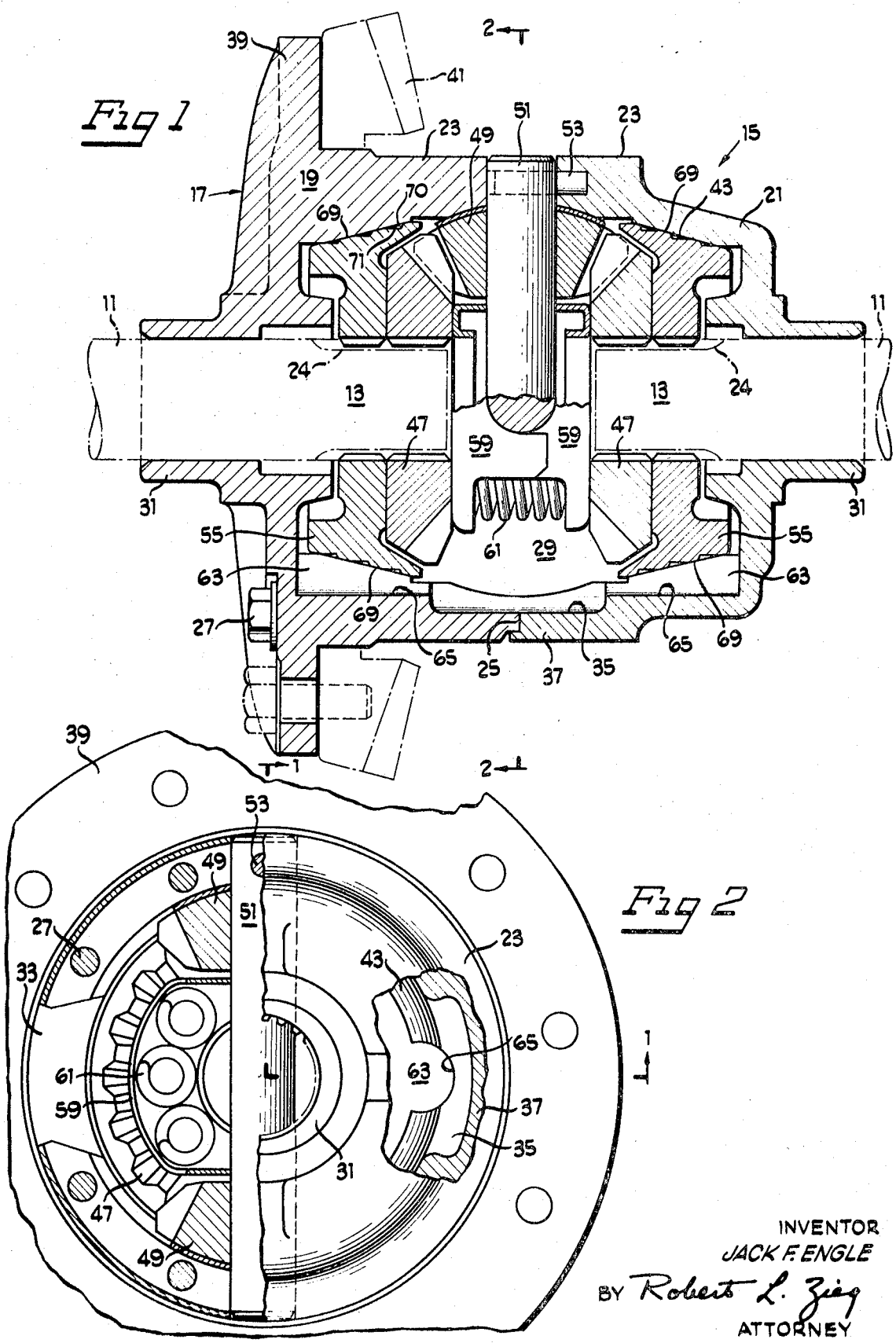

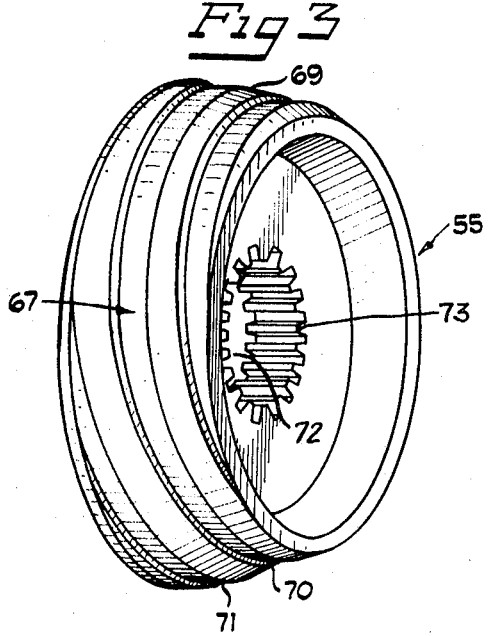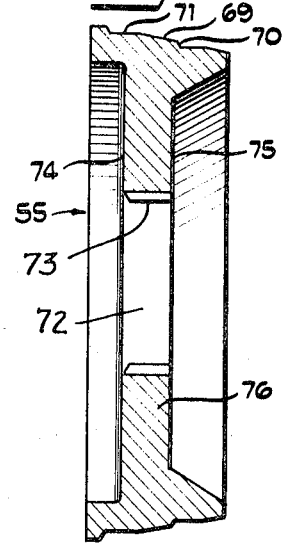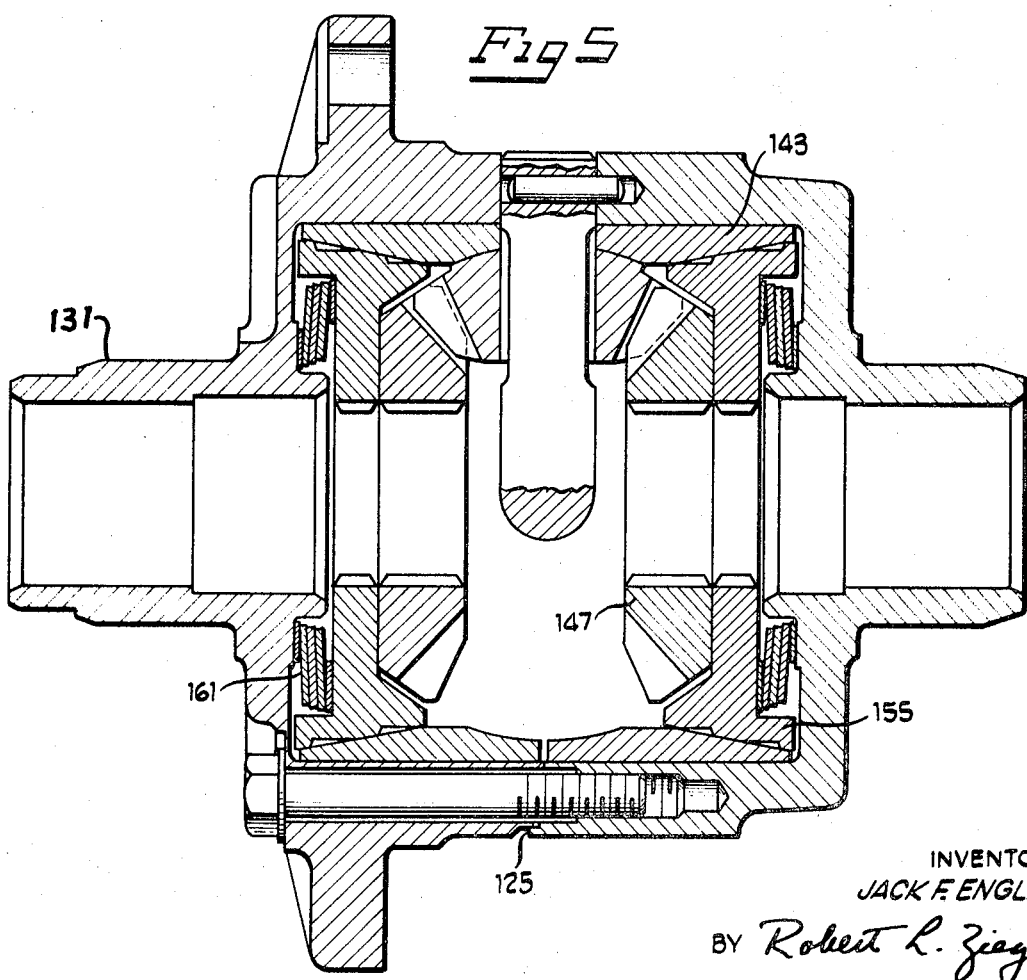

DIFFERENTIAL MECHANISM

BACKGROUND OF THE INVENTION

Cone shaped clutches have been known for many years. An inherent problem with this type clutch has been adequate lubrication. A system of supplying lubricant to cone shaped clutches used in a limited differential is described in U.S. Pat. No. 3,365,983. This system includes a threadlike groove which distributes lubricant over the cone shaped surfaces. The major drawback of that system is the cost of machining this threadlike groove in the clutch element. The present invention discloses a lubrication groove which will distribute lubricant over the cone shaped surfaces and can be formed in a die such that no expensive machining is necessary to form said groove.

SUMMARY OF THE INVENTION

The present invention relates to a cone shaped friction element for use in a limited slip differential which incorporates a lubrication groove that may be drawn from a die thus eliminating the costly operation of machining the groove into a cast part. The friction element of the present invention is especially adaptable to be formed of powdered metal pressed into a die. Parts made in this manner have proven to have excellent friction characteristics and when properly heat treated the splines and actuating surfaces have sufficient accuracy and strength so as to require no further processing. A substantial saving in the cost of friction elements is realized by using the present invention.

The present invention is for use in a limited slip differential mechanism which is adapted to provide a predetermined resistance to differential action. Such a limited slip differential mechanism utilizes conically shaped friction developing clutches to resist differentiation. Limited slip differential mechanisms are commonly used in the transmission of rotational effort to coaxially aligned and relatively rotatable shafts such as those found in the driving axle of an automotive vehicle. Differentials of this type are also useful as interaxle connections for vehicles having more than one driving axle. These mechanisms, as do conventional differentials, allow for relative rotation between shafts when necessary, such as, for example, when the vehicle is cornering. In addition, however, they resist free differential action to ensure the transmission of at least minimum rotational effort to both output shafts. This is desirable under certain conditions as when one wheel of the vehicle loses direction. To effect restrained differentiation, these mechanisms usually include friction developing means such as a clutch which provides a direct driving connection between the output shafts and the differential case. In certain of these mechanisms, the clutches include conically shaped members connected to the output shafts which are axially movable into frictional engagement with complementary conical surfaces formed within the differential case. Means may be provided to maintain a predetermined minimal bias on the clutch members to ensure continuous engagement of the cone surfaces. This ensures a predetermined minimum resistance to differentiation.

Differential action by definition causes relative movement of one output shaft with respect to the differential case and as the clutch members are interposed between the shaft and the case, a corresponding slippage or relative movement of the clutch members occur. Accordingly, it is the principal object of the present invention to provide an improved form of limited slip differential mechanism utilizing cone-shaped clutches to resist differentiation wherein improved lubrication facilities for the relatively rotating clutch surfaces are provided.

Another object of the present invention is to provide an improved form of limited slip differential mechanism in which cone shaped clutches are used to resist differentiation wherein a lubricating path is provided along opposing clutch contacting surfaces which will direct lubricant flow helically about the contacting surfaces.

Still another object of the present invention is to provide a cone shaped friction element with a lubricant path therein for use in a limited slip differential which can be produced accurately and economically.

These and other objects of the invention will become apparent with reference to the following description and the accompanying drawings wherein:

FIG. 1 is a sectional view of a differential mechanism illustrating various features of the present invention;

FIG. 2 is a fragmentary view partially in section of the apparatus of FIG. 1 taken substantially along the line 2—2 of FIG. 1;

FIG. 3 is a perspective view of the friction element of the present invention;

FIG. 4 is a cross-sectional view of the friction element of FIG. 3; and

FIG. 5 shows an alternate embodiment of the present invention.

Very generally, the present invention is directed to an improved form of limited slip differential mechanism which includes improved lubrication facilities for the relatively movable frictionally engaged surfaces of the differentiation resisting clutch components. Lubrication paths are provided which extend transversely of the clutch conical surfaces which allow the flow of lubricant in a direction generally parallel to the longitudinal axis of the output shafts. Lubrication facilities of this type may be used in cooperation with lubricant paths extending helically about one of the clutch contacting surfaces to supply lubricant to clutch components during differentiation.

Referring specifically to an embodiment of the invention illustrated in FIGS. 1 and 2, there is shown a pair of coaxially disposed relatively rotatable output shafts 11 which are adapted to transmit rotational effort to load receiving members (not shown), such as the driving wheels of an automotive vehicle. These shafts include adjacent inner splined ends 13 which are disposed in spaced apart juxtaposed relation. The differential mechanism including a differential casing 17 is interposed between the shafts 11 in overlying relation to the splined ends 13 and is adapted to transmit rotational effort to the shafts while allowing relatively rotational movement between them when necessary.

The casing 17 is formed by a pair of cooperating generally cup-shaped sections comprising a flanged section 19 and a cap section 21 which include generally cylindrical wall portions 23 disposed in abutting relation along a parting line 25. These sections are retained in abutting relation as by a bolt 27 with the exterior surface of the walls defining a portion of the exterior of the casing and the interior surface of the walls defining a cavity 29 surrounding each of the output shafts 11.

Each of the sections 19 and 21 includes a shaft opening defined by longitudinally elongated hubs 31 centrally disposed in the transverse end of that section which receives the respective shaft 11.

A side port 33 (FIG. 2) formed by laterally mating rectangular openings in each of the casing sections at their abutting ends extends through the casing wall to allow oil or other lubricant to enter the interior of the cavity 29. In addition, at least one lubricant pocket 35 is provided on the interior of the cavity formed by the casing walls to provide a reservoir to collect quantities of lubricant during rotation of the casing. These pockets are formed by laterally mating depressions in the interior of the casing sections at the abutting ends of the sections which extend partially through the walls 23 toward the exterior of the casing where they are closed by web 37.

It should be understood that the number of side ports 33 and lubricant pockets 35 provided in the differential mechanism shown are merely illustrative and may be varied without departing from the scope of the invention.

The flange 19 of the casing 17 includes a radially directed flange 39 extending about its exterior periphery to which is secured a ring gear 41 shown in phantom lines which is adapted to receive rotational effort from an associated drive line (not shown) for transmission to the output shafts 11.

Each of the sections 19 and 21 are further provided with a generally frusto-conical shaped surface within the cavity 29 forming a pair of spaced apart truncated cone shaped drums 43 concentrically disposed with respect to the longitudinal centerline of the shafts 11. The drums are formed such that the conical surfaces converge toward the hubs 31 of the respective section within which they are formed, that is, axially away from the parting line 25.

To effect transmission of rotational effort to the output shafts 11 while allowing for a relative rotational movement between shafts, a bevel gear system is provided within the differential casing 17.

The bevel gear system includes a pair of side gears 47 each of which is connected to one of the ends 13 of the shafts 11 to transmit rotational effort thereto. The gears include splined inner bores which receive splines 24 of the shafts 11. The gears therefore are axially movable with respect to the shafts and are rotatable therewith.

The bevel gear system further includes a pair of pinion gears 49 rotatably supported by a transversely extending pinion shaft 51. These gears are spaced equidistant from the longitudinal centerline of the output shafts 11 in intermeshing engagement with the side gears 47. The pinion shaft 51 extends transversely of the differential casing 17 between the side gears 47. The shaft is secured to the casing section by dowel pin 53 and is therefore rotatable therewith.

It is preferred that the teeth of the pinion gears and the side gears be of a configuration such that the transmission of torque from the housing, pinion shaft and pinion gears to the side gears results in a substantial axial force component parallel to the output shafts, tending to separate the side gears. The purpose of this relationship will become apparent shortly.

When rotational effort is received by the differential casing 17 from the drive line (not shown) the casing is called to rotate about the longitudinal centerline of the output shafts 11. Such action causes the pinion shaft 51 to revolve in a plane perpendicular to the output shaft centerline causing the pinion gears 49 to traverse a circular path about the output shafts. As the pinion gears 49 are interconnected with the side gears 47 rotational movement from the pinion gears with respect to the output shaft in turn causes the side gears to rotate about the axes of the output shafts. This rotation is transmitted to the splined ends 13 of the output shafts to the load receiving members.

When differential action is required as when a vehicle is cornering, or when any other condition exists wherein one driving wheel is required to make a greater number of revolutions than the other, the pinion gears not only revolve about the output shaft 11, but also rotate upon the pinion shaft 51 allowing relative movement between side gears and consequently relative rotation between shafts 11.

Under certain circumstances the ability of the differential mechanism to provide for relative rotation between output shafts is a disadvantage rather than an advantage. For example, when one driving wheel of a vehicle is on a slippery pavement and the other is on dry pavement, free differential action prevents the transmission of rotational effort to the wheel having traction. The side gear associated with the wheel having traction would remain stationary and the pinion gears would revolve about it in their circular path about the output shafts and simultaneously rotate about the pinion shaft 51 resulting in rotation of only the wheel without traction. To overcome this inherent operational characteristic, the differential mechanism 15 of the illustrated embodiment is provided with means for resisting differential action to the extend that an initial predetermined rotational effort will be applied to the wheel having the greater traction and to the extent that an additional cumulative rotational effort will be applied to the wheel having the greater traction as a function of the input torque to the differential mechanism.

As best seen in FIG. 1, there is provided within the cavity 29 a pair of truncated cone shaped clutch members 55 disposed for frictional engagement with the conically shaped drums 43 formed on the interior of the differential casing 17. Each of the cone shaped clutch members 55 is provided with a splined inner bore which engages the splined end 13 of one of the output shafts 11 so that the clutch member 55 is both rotatable with the shaft and axially movable thereon.

The clutch members 55 are spaced laterally outwardly from the transversely extending pinion shaft 51 with the side gears 47 of each shaft positioned intermediate to shaft 51 and the clutch member 55. The clutch member 55 and the side gear 47 associated with each shaft are in transverse abutting contact so that axial movement of one of the members in a direction toward the other member effects a corresponding axial movement of that member.

It should be appreciated that though the side gears and the clutch members are depicted as separate elements, they may readily be formed of a single component without in any way departing from the scope of the present invention.

As the clutch members are splined to their respective output shafts 11 engagement of the cone shaped clutch members 55 with the mating drum surfaces 43 of the differential casing 17 provides a means for transmission of rotational effort directly from the differential casing to the shafts 11. Such a direct driving connection assures the transmission of a predetermined rotational effort to each of the output shafts independent of the tractive condition associated with the output shafts. In this manner, differentiation is retarded to the extent of the frictional engagement capacity of the clutch members.

Frictional engagement of the clutch members is provided by a spring pack assembly extending between the side gears 47 and overlying the transverse pinion shaft 51. The spring pack assembly includes a pair of gear contacting members 59 each of which includes a transverse face in contact with one of the side gears. The gear contacting members are urged outwardly by a plurality of compressed coil springs 61 which may be equally distributed on either side of the pinion shaft 51 to ensure uniform load application upon the contacting members and consequently the side gears 47.

The outward force applied to the side gears 47 by the spring pack is in turn transferred to the clutch members 55 urging them into frictional engagement with the frusto-conical drums 43 of the casing 17 to provide an initial friction driving relation between them to transmit at least a minimum rotational effort from the housing 17 directly to the output shafts 11. The number of springs used in the spring pack and their size and the spring rate may be varied to offer the preload on the clutch members to achieve the particular operational characteristics desired for a particular application.

In addition to the initial preload of the clutch members provided by the spring pack assembly, laterally separating forces between the pinion side gears contribute to the degree of frictional engagement between the clutch components. As the torque input of the differential mechanism increases, the separating force upon the pinion and side gear also increases, thus increasing the axial force exerted on the clutch members by the side gear. In this manner the clutch members are urged into further frictional engagement to provide a cumulative increase in the degree of resistance to differential action.

An alternate arrangement of the friction clutch members 55 and drums 43 is shown in FIG. 5. In this embodiment the drum 143 is arranged such that the conical surface is converged inwardly from the hubs 131 of the respective section within which they are formed, that is, axially toward the parting line 125. The friction clutch members 155 are urged into engagement with the cylindrical drums 143 by Belleville springs 161 to provide the initial preload. Thus in the embodiment shown in FIG. 5 the separating force of the side gears 147 will tend to relieve the preload of the springs 161 and therefore provide a decrease in resistance to differential action under the conditions of increasing torque.

As explained previously, in certain instances relative rotation between output shafts is necessary to accomplish certain desired results such as when a vehicle negotiates a corner or curve wherein one drive wheel must turn at a faster rate than the other. Under these circumstances, it is necessary that the frictional engagement between the clutch members and the cones be overcome so that relative movement between the shafts may be effected. When this occurs the clutch members must, of necessity, slip with respect to the drum surface to allow relative movement of one shaft with respect to the other. Additionally, when one drive wheel loses traction, the clutch members slip rapidly in opposite directions upon the drum surface. This is true even though the axial force imparted to the clutches by the side gears is relatively great.

As can be appreciated, excessive slippage between the clutch components may cause serious damage to the contacting surfaces and may result in premature failure of the differential mechanism.

To prevent the occurrence of such adverse consequences, lubrication facilities are provided which provide the contacting surfaces of the clutch members with lubricant to reduce the coefficient of friction between the contacting surfaces and also aid in the dissipation of heat generated during differential action.

As seen in FIGS. 1 and 2, a laterally extending channel 63 is provided in each of the drum surfaces 43. The channel 63 is open at the drum surface and extends axially outwardly from the lubricant pocket 35 formed in the casing wall 23. The channel intersects the lubricant pocket intermediate the web 37 and the interior surface of the wall 23 to ensure free flow of lubricant from the pocket to the channel. The channel is of generally semicircular cross-section and extends laterally across the entire drum surface. It includes a bottom surface 65 which is formed so as to extend generally parallel to the axes of the output shafts 11. As the lubricant pocket 35 normally collects lubricant within the cavity 29 during rotation of the differential casing 17, the channels 63 are provided with an ample supply of lubricant for distribution to the conical surfaces of the clutch component. Further, as the bottom surface 65 of the channel is parallel to the axes of the output shafts 11 no change in position relative to the axes of the output shafts is experienced by the lubricant as it progresses outwardly from the pocket 35 along the channel 63. Though only one such laterally extending channel is shown in each drum surface, it should be appreciated that more than one may be used without departing from the scope of this invention.

The embodiment of this invention shown in FIGS. 1 and 2 further includes a helically progressing groove 67 extending about the contacting surface of each of the conical clutch members 55. The pitch or lead of this groove is such that the lands 69 are formed between successive portions of a groove. These lands provide the necessary area for contact with the drum surfaces 43 without excessive unit loading upon the contact area.

The grooves 69 are adapted to direct lubricant from the cavity 29 along the clutch contacting surfaces outwardly in a spiral progression toward the hub 31 of the casing 17. This spiral pattern causes the lubricant to wipe the entire conical clutch drum surface 43 providing continuous movement of the lubricant across the frictionally engaged contacting surfaces. With a construction as shown in the illustrated embodiment, lubricant may progress laterally along the channel 63 to provide an ample supply for distribution along the contacting surfaces by the spirally progressing grooves 67.

According to the present invention the friction element or clutch member 55 as best shown in FIGS. 3 and 4, is designed to be produced in a die using powdered metal. Parts made in this manner may be produced at a much smaller cost than parts having to be machined from solid block. In order to make a finished part, and thus save all the machining costs, the spirally extending groove or lubricating channel 67 is designed so that it can be removed directly from a die. By defining the lubricating channel as having only two sides, 70 and 71, the side 70 being substantially perpendicular to the longitudinal axis of the cone shaped clutch member 55 and the side 71 being substantially parallel to the axis of the cone shaped clutch member 55, no obstructions are formed to prevent the part from being withdrawn from a die. It will be seen that a groove or channel so defined forms lands 69 between the successive portions of the groove or channel 67 which forms the conical surfaces of the friction clutch member 55. These lands 69 provide the necessary friction area for contact with the conical drums 43 and the spiraling groove 67 provides a channel for the flow of lubricant over the friction surfaces to prevent excessive wear and harmful heat buildup.

The friction clutch member 55 is further defined as having a central bore 72 along the central axis thereof. The spline means 73 in said bore are also formed in the die from which the powdered metal part is cast. Also formed in the friction clutch member 55 are recesses areas 74 and 75, one on either side of the central web 76 of the friction clutch member 55. These areas are adapted to be contacted by actuating members such as the side gears 47 and/or the preloading springs 61 of the embodiment shown in FIG. 5.

A part so designed may be formed in one operation, as by casting in a die using powdered metal. A part thus formed is then heat treated and the conical surface finish ground. The grinding of the conical surface is the only machining operation that is necessary. It is obvious that a part so formed is more economical than having to make the groove 67, the splines 73, and both of the recesses areas 74 and 75 by a machining process.

It should be obvious that parts such as friction clutch member 55 could be made by a process other than powdered metal casting without departing from the scope of this invention.

Various features of the invention have been particularly shown and described; however, it should be obvious to one skilled in the art that modifications may be made therein without departing from the scope of the invention.

I claim:

1. A limited slip differential mechanism comprising a differential cast casing receiving an input torque for transmission to a pair of coaxially aligned relatively rotatable output shafts, said casing including a pair of coaxially aligned spaced apart hubs to receive the output shafts, at least one conically shaped drum surface formed in the interior of said cast casing, at least one conically shaped clutch member disposed within said casing and connected to one of the output shafts, means urging said clutch member into a predetermined friction engagement with said drum surface, a bevel gear system disposed within said casing including at least one side gear connected to the output shaft for transmission of rotational effort thereto, said bevel gear system applying an axial force upon said clutch member in a direction to alter said frictional engagement, means to allow entry of lubricant into said casing, at least one lubricant channel formed in said drum defining an opening extending laterally therefrom, said channel including a surface disposed opposite said opening which extends laterally of said drum parallel to the longitudinal axes of said hubs, and a spirally progressing groove formed in said conically shaped clutch member defining a series of lands between adjacent portions thereof, said lands forming said conical surface for contacting said drum, said groove being defined by only two sides, one of said sides being substantially parallel to the longitudinal axes of said cone.

2. A cone shaped friction element for use in a limited slip differential, said friction element having a means to supply lubricant, said means being a spirally progressing groove defining lands intermediate successive portions thereof, said lands forming said conical surface, said groove being defined by only two sides, one side of said groove being substantially parallel to the axis of said cone, the other side of said groove being substantially perpendicular to the axis of said cone.

3. A friction element as in claim 2 wherein said friction element has a bore along the central axis thereof, said bore having splines formed therein.

4. A cone shaped friction element as in claim 2 wherein at least one side of said cone has a recessed surface, said recessed surface being adapted to receive an actuating force.

5. A friction element as in claim 4 which is formed of powdered metal by compression in a die.

6. A friction clutch member for use in a limited slip differential, said friction clutch member being of conical form and having a conical surface thereon, said conical surface for frictionally engaging a mating surface, said friction member having means to supply lubricant, said means comprising a spirally progressing channel formed in said conical surface, said channel having only two sides, one of said sides of said channel being substantially parallel to the axis of said cone, the other side of said channel being substantially perpendicular to the axis of said cone, said channel defining lands intermediate successive portions thereof, said lands forming said conical surface.

* * * * *